United States Patent
Gideon et al.

(10) Patent No.: US 8,709,319 B2
(45) Date of Patent: *Apr. 29, 2014

(54) COMPRESSION MOLDING METHOD AND REINFORCED THERMOPLASTIC PARTS MOLDED THEREBY

(75) Inventors: David E Gideon, Edmonds, WA (US); Edward M Fisher, Jr., Huntsville, AL (US)

(73) Assignee: The Boeing Company, Chicago, IL (US)

( * ) Notice: Subject to any disclaimer, the term of this patent is extended or adjusted under 35 U.S.C. 154(b) by 930 days.

This patent is subject to a terminal disclaimer.

(21) Appl. No.: 12/613,842

(22) Filed: Nov. 6, 2009

(65) Prior Publication Data

US 2011/0111172 A1    May 12, 2011

(51) Int. Cl.
   *B29C 43/18*    (2006.01)
(52) U.S. Cl.
   USPC ............................... 264/257; 264/328.17
(58) Field of Classification Search
   CPC ...... B29C 70/12; B29C 70/46; B29C 70/465; B29C 70/467; B29C 70/86
   USPC ................... 264/257, 258, 328.17
   See application file for complete search history.

(56) References Cited

U.S. PATENT DOCUMENTS

| | | | |
|---|---|---|---|
| 2,949,054 A | 8/1960 | White | |
| 3,646,610 A | 2/1972 | Jackson | |
| 4,370,390 A | 1/1983 | Burk | |
| 4,433,652 A | 2/1984 | Holtzberg et al. | |
| 4,925,719 A | 5/1990 | Staneluis et al. | |
| 4,983,451 A | 1/1991 | Sugino et al. | |
| 4,987,175 A | 1/1991 | Bunnell, Sr. | |
| 5,056,257 A | 10/1991 | Cook | |
| 5,057,257 A | 10/1991 | Neitzke | |
| 5,062,415 A | 11/1991 | Weatherby et al. | |
| 5,090,857 A | 2/1992 | Dunn | |
| 5,151,322 A * | 9/1992 | Kimoto et al. | 428/299.1 |
| 5,292,215 A | 3/1994 | Roberts, III | |
| 6,106,752 A | 8/2000 | Chang et al. | |
| 6,521,152 B1 | 2/2003 | Wood et al. | |
| 6,924,021 B1 | 8/2005 | Colegrove et al. | |
| 7,198,739 B2 | 4/2007 | LaForest et al. | |
| 7,208,220 B2 * | 4/2007 | Yamasaki et al. | 428/296.4 |
| 7,462,879 B2 | 12/2008 | Oohata et al. | |
| 7,527,759 B2 * | 5/2009 | Lee et al. | 264/319 |
| 7,896,599 B2 | 3/2011 | Stephen et al. | |
| 8,101,262 B2 * | 1/2012 | Yamanouchi et al. | 428/119 |

(Continued)

FOREIGN PATENT DOCUMENTS

| | | |
|---|---|---|
| EP | 0376472 A2 | 7/1990 |
| EP | 0419403 A1 | 3/1991 |

(Continued)

OTHER PUBLICATIONS

International Search Report, dated Feb. 10, 2011, regarding Application No. PCT/US2010/048017 (WO2011056293), 3 pages.

(Continued)

*Primary Examiner* — Jill Heitbrink
(74) *Attorney, Agent, or Firm* — Yee & Associates, P.C.

(57) ABSTRACT

A fiber reinforced part is formed from a compression molded thermoplastic resin reinforced with individual fibers of differing lengths randomly oriented substantially throughout the part.

13 Claims, 6 Drawing Sheets

(56) References Cited

U.S. PATENT DOCUMENTS

| | | | |
|---|---|---|---|
| 2003/0057590 A1* | 3/2003 | Loher et al. | 264/157 |
| 2006/0125156 A1* | 6/2006 | Woolhouse | 264/571 |
| 2007/0149080 A1* | 6/2007 | Asahara et al. | 442/239 |
| 2008/0169380 A1* | 7/2008 | Jackson et al. | 244/129.3 |
| 2009/0110901 A1* | 4/2009 | Gaw et al. | 428/297.4 |
| 2010/0178495 A1* | 7/2010 | Taketa et al. | 428/339 |
| 2013/0022391 A1 | 1/2013 | Fisher, Jr. et al. | |
| 2013/0047403 A1 | 2/2013 | Gideon et al. | |

FOREIGN PATENT DOCUMENTS

| | | | |
|---|---|---|---|
| EP | 0916477 A1 | | 5/1999 |
| GB | 2349600 A | | 11/2000 |
| WO | 8909123 A1 | | 10/1989 |
| WO | 2008/149615 | * | 12/2008 |
| WO | 2009120920 A1 | | 10/2009 |
| WO | PC/US2010/048017 | | 2/2011 |
| WO | 2011056293 A1 | | 5/2011 |

OTHER PUBLICATIONS

"Compression Molding," http://en.wikipedia.org/wiki/Compression_molding, May 26, 2012, 4 pages.
"Fabrication Methods," http://www.compositesworld.com/articles/fabrication-methods, Nov. 1, 2007, 9 pages.
Hexcel Corporation, "HexMC/C/2000/R1A Product Data," Publication FTC112f, Dec. 2008, 2 pages.
"Thermoplastic Composites Making an Impact," http://www.compositesworld.com/articles/thermoplastic-composites-making-an-impact, Feb. 1, 2003, 6 pages.
Fisher, Jr., "Narrow Flake Composite Fiber Material Compression Molding," U.S. Appl. No. 13/356,132, filed Jan. 23, 2012, 23 pages.
Pan et al., "Analysis of 3D Random Chopped Fiber Reinforced Composites Using FEM and Random Absorption," ScienceDirect, Computational Materials Science, vol. 43, Issue 3, Sep. 2008, pp. 450-461.
Black "Redeisgning for Simplicity and Economy," High-Performance Composites, Jan. 2012, 4 pages, accessed Feb. 28, 2013, http://www.compositesworld.com/articles/redesigning-for-simplicity-and-economy.
Gideon et al., "Compression Molding Method and Reinforced Thermoplastic Parts Molded Thereby," U.S. Appl. No. 13/653,080 and Preliminary Amendment, filed Oct. 16, 2012, 43 pages.
"HexMC Moulding Concept Carbon Epoxy HexMC/C/2000/M77 Product Data," Hexcel Corporation, Publication FTC112h, Oct. 2012, 2 pages.
"HexTow Chopped Fiber Carbon Fiber Product Data," Hexcel Corporation, Sep. 2009, 2 pages.
Bartel et al., "Method and Apparatus for Fabricating Composites Fasteners," U.S. Appl. No. 13/773,042, filed Feb. 21, 2013, 29 pages.
Blom, "Hybrid Fastener and Method of Making the Same," U.S. Appl. No. 13/773,120, filed Feb. 21, 2013, 25 pages.
Office Action, dated Apr. 11, 2013, regarding U.S. Appl. No. 13/653,080, 32 pages.

* cited by examiner

COMPRESSION MOLDING METHOD AND REINFORCED THERMOPLASTIC PARTS MOLDED THEREBY

TECHNICAL FIELD

This disclosure generally relates to compression molding techniques, and deals more particularly with a method of compression molding fiber reinforced thermoplastics parts.

BACKGROUND

Various efforts have been directed toward replacing machined metal parts with lighter weight molded materials. For example, in the aircraft industry, some metal parts have been replaced by plastic or composite parts that are formed using any of a variety of techniques. In addition to weight savings, parts made of polymeric materials may be manufactured more economically, due in part to the reduction of machining time and material waste.

Prior efforts to manufacture relatively high strength parts using polymeric materials have involved compression molding sheet-molding compounds, and laying up various forms of composite laminates using thermoset materials. Each of these prior efforts may have disadvantages. For example, low viscosity thermoset materials have limited flow distances during molding, and therefore may not be capable of producing parts of higher complexities. The use of sheet forms may not be suitable for making parts that are small, complex or have changes in cross sectional geometries. Existing manufacturing techniques may also require relatively complex layups and/or complicated molds which may not be cost effective for some applications. Finally, polymeric parts made by existing processes may not exhibit mechanical properties that are substantially the same in all directions. For example, laminated parts may not possess the same mechanical strength in both the in-plane and through-the-thickness directions of the laminate. Similarly, molded thermoset-resin chopped fiber parts may suffer from low mechanical strength in the through-the-thickness direction.

Accordingly, there is a need for a method of high flow compression molding high strength, complex polymeric parts that exhibit essentially isotropic or quasi-isotropic mechanical properties. There is also a need to replace machined metal parts with composite materials in order to reduce both part weight and manufacturing costs.

SUMMARY

In accordance with the disclosed embodiments, high flow compression molding of fiber reinforced thermoplastic resins reduces separation of the resin from the fibers during the molding process, thereby reducing resin-rich and resin-poor areas that may be undesirable. The molding method produces at least near net shape carbon composite parts and fittings of complex geometries and tight dimensional tolerances. The disclosed method allows long flow lengths of the resin and fiber mixture through relatively complex mold passages, resulting in three dimensional arrangements of fibers having differing lengths that promote isotropic properties in the part. The disclosed method is relatively simple and may eliminate the need for pre-forms by optimizing the shape of the fibers. The disclosed method is useful in compression molding a variety of part features, including, but not limited to draft angles, ribs, cutouts, radii, holes, clevis and lugs, to name only a few. The relatively high strength and toughness of the compression molded thermoplastic parts allows metal inserts such as lugs and bushings to be incorporated into the part.

According to one disclosed embodiment, a method is provided of making a composite part. The method includes producing a plurality of flakes each containing fibers. A mold charge is formed by introducing the flakes and a thermoplastic resin into a mold. The charge is compression molded into a part. Producing the flakes may include cutting each of the flakes from fiber reinforced prepreg. The method may further comprise mixing flakes of at least two different shapes, wherein forming the charge includes introducing the flakes of two different shapes into the mold. The compression molding method may include compressing the mold charge at a rate that results in turbulent flow of the mold charge through the mold. The method may further comprise forming a hole in the molded part, and installing a metal hardware insert into the hole.

According to another disclosed embodiment, a method is provided of molding a fiber reinforced composite part. The method includes cutting a plurality of flakes from a unidirectional fiber perform pre-impregnated with a thermoplastic resin, and forming a mold charge by introducing a preselected quantity of the flakes into the mold. The method includes compression molding the mold charge into a mold cavity at a relatively high flow rate that distributes the fiber substantially uniformly through the mold cavity with a substantially random fiber orientation. Cutting the flakes may include die cutting the flakes from a strip of unidirectional prepreg tape. The flakes may be in the shape of one or more of a square, a rectangle, a circle, an ellipse, a trapezoid, a triangle, a hexagon or a diamond.

According to a further embodiment, a reinforced composite part comprises a compression molded thermoplastic resin having randomly oriented fiber of differing lengths providing multi-directional reinforcement. The fibers are generally randomly oriented substantially throughout the part. The part may further comprise at least one hole and a metal hardware insert secured within the hole. In one embodiment, the hole may be threaded, and the hardware insert may include a HeliCoil®. The parts exhibit substantially quasi-isotropic properties.

The disclosed method of compression molding and the fiber reinforced thermoplastic part produced thereby satisfies the need for a relatively low cost manufacturing technique for producing reinforced thermoplastic parts of relatively complex geometries that exhibit substantially isotropic or quasi-isotropic properties.

BRIEF DESCRIPTION OF THE ILLUSTRATIONS

DETAILED DESCRIPTION

Figure 1:
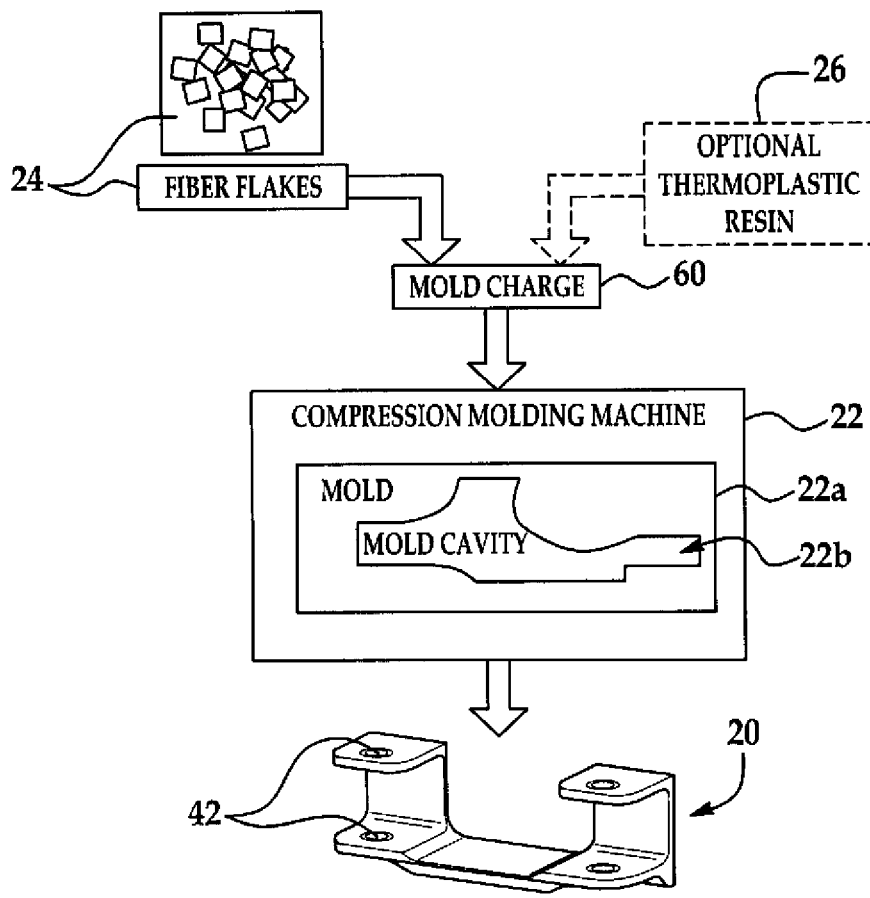
FIG. 1 is an illustration of a block diagram of a compression molding process, including a perspective view of a reinforced thermoplastic part molded thereby.

Referring first to FIG. 1, the disclosed embodiments relate to a method of high flow compression molding a fiber reinforced thermoplastic part 20 using a compression molding machine 22. The molding machine 22 includes a mold 22a having a mold cavity 22b into which a mold charge 60 is introduced. The mold charge 60 comprises randomly oriented fiber flakes 24. As used herein, "high flow" molding refers to flow of the mold charge 60 over relatively long distances though the mold cavity 22b, where "long distances" refers to distances that are multiples of the maximum length dimension of an individual flake 24. Also, as used herein, "flakes" and "fiber flakes" refer to individual pieces, fragments, slices, layers or masses that contain fibers suitable for reinforcing the part 20.

As will be discussed later in more detail, in one embodiment, the mold charge 60 may comprise only fiber flakes 24 that are formed from a unidirectional fibers pre-impregnated with a thermoplastic resin. In this embodiment, the source of the thermoplastic resin which forms that part 20 is derived solely from the resin contained in the flakes 24. Alternatively, in another embodiment, it may be possible to use tackified dry fiber flakes 24 that may not be pre-impregnated with resin, in which case a premeasured quantity of thermoplastic resin 26 may be added to the charge 60.

The flakes 24 have one or more specific shapes which aid in maintaining a substantially uniform distribution and random orientation of the reinforcing fibers 33 (see FIGS. 3 and 4) within the melted mixture of resin and reinforcing fibers as the melted mixture of fibers and thermoplastic resin flows through various features, constrictions and extremities (all not shown) within the mold cavity 22b. The specific shapes of the flakes 24 also assist in imparting quasi-isotropic mechanical properties to the part 20 by incorporating various lengths of fiber reinforcement within the mixture. The thermoplastic resin which either forms part of the flakes 24 or which is added to dry flakes 24, may comprise a relatively high viscosity thermoplastic resin such as, without limitation, PEI (polyetherimide) PPS (polyphenylene sulphide), PES (polyethersulfone), PEEK (polyetheretherketone), PEKK (polyetheretherketone), and PEKK-FC (polyetherketoneketone-fc grade), to name only a few. The reinforcing fibers in the flakes 24 may be any of a variety of high strength fibers, such as, without limitation, carbon, metal, ceramic and/or glass fibers. It may also be possible to reinforce the part 20 by adding metallic and/or ceramic particles or "whiskers" to the mold charge 60.

As will be discussed below, the mold charge 60 is subjected to heat and pressure in the compression molding machine 22 which result in relatively fast flow rates of the melted resin and fiber mixture that may approach or achieve turbulence at least in some parts of the mold cavity 22b, especially when combined with mold wall effects. Optionally, the part 22 may have hardware inserts formed from any of various metals, which are either molded into the part 20 as part of the molding process, or are installed after the part 20 has been molded.

Figure 2:
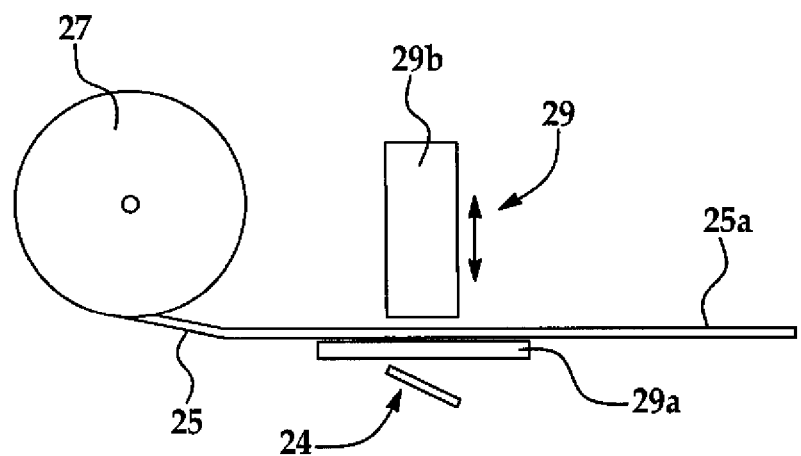
FIG. 2 is an illustration of a diagram showing a method of cutting fiber flakes used in reinforcing the thermoplastic part shown in FIG. 1.

Referring to FIG. 2, the flakes 24 may be, for example and without limitation, formed by die cutting individual flakes 24 from a roll 27 of unidirectional prepreg tape 25 having a backing 25a using a cutting die 29. Alternatively, as previously mentioned, it may be possible to form the flakes 24 from a tackified dry fiber perform (not shown), as by die cutting or other techniques. The cutting die 29 may include a stationary portion 29a which supports the tape 25 while a matching reciprocating die member 29b cuts the flake 24 from the tape 25. The backing 25a may be taken up on a second roll (not shown). Alternatively, the flakes 24 may be cut from a sheet (not shown) of unidirectional prepreg. It may also be possible to form the flakes 24 using other production processes.

Figure 3:
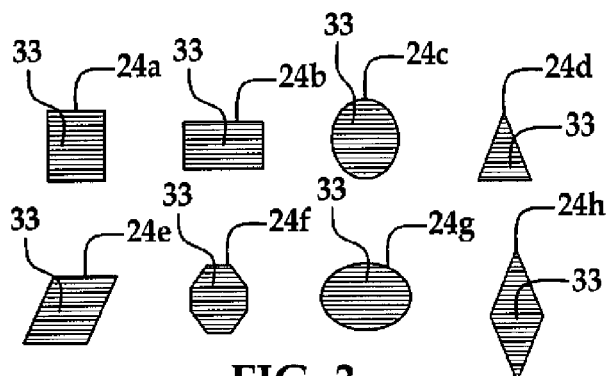
FIG. 3 is an illustration showing typical shapes for the flakes.

The flakes 24 may be substantially flat and may have any of various outline shapes. For example, as shown in FIG. 3, the flakes 24 may have the shape of a square 24a, a rectangle 24b, a circle 24c, an equilateral triangle 24d, a trapezoid 24e, a hexagon 24f or other polygon (not shown), an ellipse 24g or a diamond 24h. Other shapes are possible. In some embodiments, flakes 24 with two or more of the shapes 24a-24h may be mixed together with the thermoplastic molding compound 26 in order to provide a mixture having fibers 33 of differing lengths.

Figure 3A:
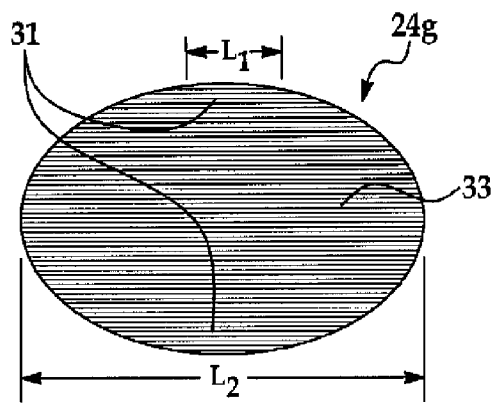
FIG. 3A is an illustration of a fiber flake showing the presence of differing fiber lengths.

The presence of fibers 33 having differing lengths in the mixture aids in achieving a more uniform distribution of the flakes 24 in the part 20, while promoting isotropic mechanical properties and/or strengthening the part 20. Flakes 24 having shapes such the circle 24c, triangle 24d, hexagon 24f, ellipse 24g and diamond 24h, may be particularly useful in improving the isotropic mechanical properties of the part 20 because of the fact that these shapes result in each flake 24 having differing fiber lengths. For example, as shown in FIG. 3A, the fibers 31 near the top and bottom of the flake 24g have a length $L_1$ that is considerably shorter than the length $L_2$ of the fibers 33 near the middle of the flake 24g. Long fibers 33 may provide high strength in a particular direction, while shorter length fibers 31 allow the flakes 24 to be more easily formed into complex three dimensional arrangements. Accordingly, a combination or mix of long and short fiber lengths within a single flake 24 may be particularly desirable. Generally, the size and shape of the flakes 24 may be selected to optimize the flow, strength and finish quality of the part 20.

Figure 4:
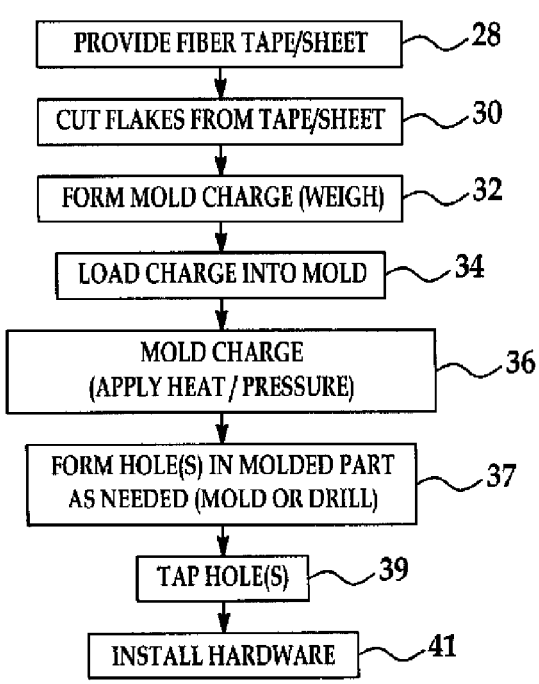
FIG. 4 is an illustration of a flow diagram of a method of compression molding a fiber reinforced thermoplastic part, optionally having hardware inserts.

Referring now to FIG. 4, the part 20 described above may be manufactured using one embodiment of a method that begins at step 28 with providing a tape or sheet of unidirectional fiber prepreg, or in other embodiments, a tackified dry fiber preform. At step 30, the flakes 24 may be cut from the tape or sheet to the desired outline shape. At step 32, a mold charge 60 (FIG. 1) is formed by measuring, typically by weighing, a quantity of the flakes 24 that is to form the charge 60 for a particular part 20. In those cases where the flakes 24 are made from a tackified dry perform, a quantity of the thermoplastic resin 26 is also weighed which is to form part of the charge 60.

The mold charge 60 consisting of the premeasured quantity of the flakes 24 (and optionally, the premeasured thermoplastic resin) is loaded into the mold 22a, such the fiber orientations of the flakes 24 are substantially random. In those embodiments where the fiber flakes 24 are derived from a tackified dry fiber preform and it is necessary to separately add thermoplastic resin 26 to the charge 60, it may be desirable to arrange the flakes 24 and the resin 26 in multiple, alternating layers within the mold 60 to aid in mixing of resin 26 with the dry fiber flakes 24 during the molding process. At step 36, the mold charge 60 is compression molded to produce a relatively high rate of flow of the charge throughout the mold cavity 22b (FIG. 1). The flow rate of the mold charge 60 through the mold cavity 22b will depend the amount of heat and pressure that is applied during the molding process which in turn may be dictated by the particular application.

In those cases where the part 20 includes hardware inserts 42, an additional set of steps 37, 39 and 41 may be performed. At step 37, one or more holes are formed in the molded part 20, either by molding the holes into the part 20 or by a machining process such as drilling the part 20 after the part has been removed from the mold 22a (FIG. 1). In those cases where the hardware insert 42 may include threads, then the hole is tapped at 39, following which the hardware insert 42 may be installed at step 41.

Figure 5:
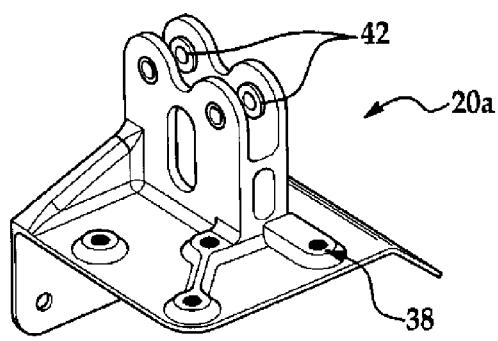
FIGS. 5, 6, 7 and 8 are illustrations of perspective views of typical fiber reinforced thermoplastic parts produced by the disclosed molding method.
Figure 6:
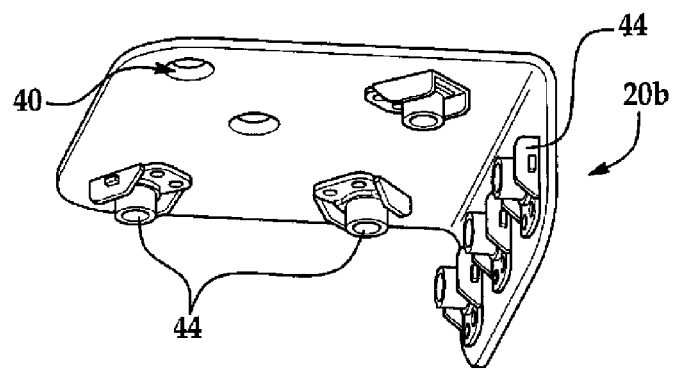
Figure 7:
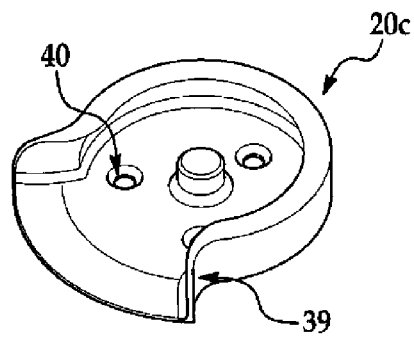
Figure 8:
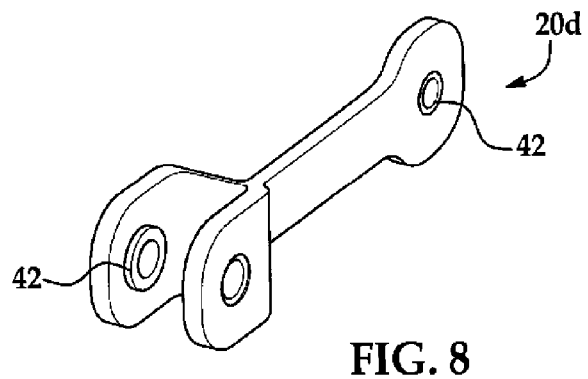

FIGS. 5, 6, 7 and 8 illustrate typical parts having relatively complex features that may be compression molded using the disclosed molding method. FIG. 5 illustrates a fitting 20a having integrally molded raised bosses 38 and bushing inserts 42. FIG. 6 illustrates a horizontal doubler 20b having molded-in, countersunk holes 40 and nut plate inserts 44. FIG. 7 illustrates a pivot fitting 20c having thinly tapered extremities 39 and molded-in countersunk holes 40. FIG. 8 illustrates a load transfer bar 20d having molded-in bushings 42.

Figure 9:
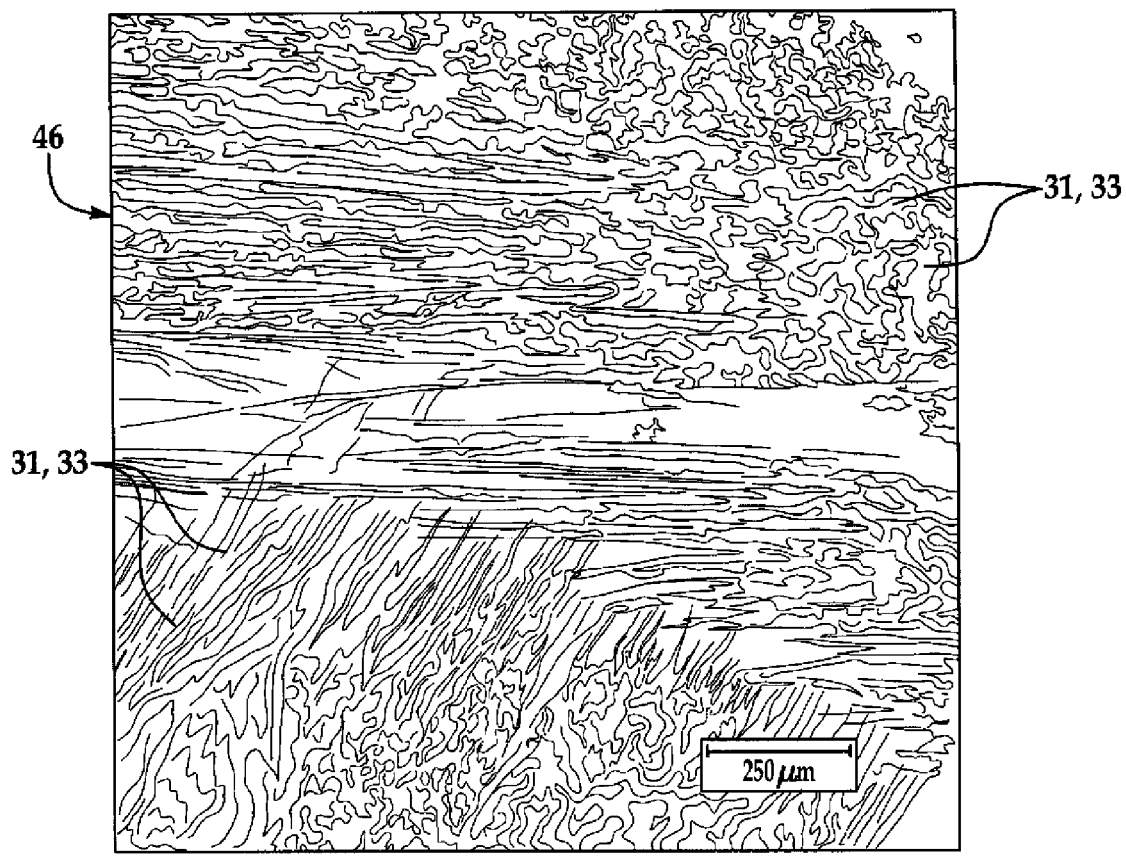
FIG. 9 is an illustration of a sectional view of a compression molded part showing the part's complex fiber microstructure.

FIG. 9 illustrates, on a magnified scale, the relatively complex fiber microstructure of a part 20 manufactured by the disclosed compression molding method which results from use of relatively high viscosity thermoplastics and the extended distances over which the mold charge 60 (FIG. 1) is made to flow with causing separation of the fibers 31, 33. The high viscosity of the thermoplastic molding resin tends to carry the reinforcing fibers 31, 33 along with the resin flow throughout the mold cavity 22b (FIG. 1) and may maintain the flakes substantially evenly distributed, rather than allowing the concentration of the flakes in any particular area to become too high or too low. The relatively uniform distribution of the fibers 31, 33 in the finished part 20 results in part from the fact that the fibers 33 are initially distributed uniformly in their prepreg state before the resin in the flakes 24 melt away. The relatively complex fiber microstructure shown in FIG. 9, in which the fibers 31, 33 are distributed substantially uniformly with substantially random fiber orientations, results in the part 20 exhibiting substantially isotropic or quasi-isotropic mechanical properties and relatively complex failure modes.

Figure 10:
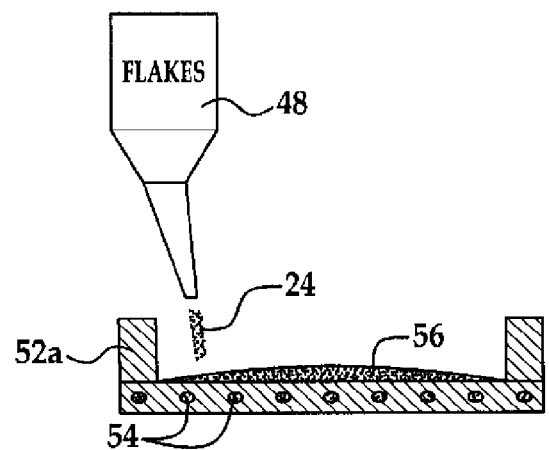
FIG. 10 is an illustration of a diagram showing an open compression mold being charged with prepreg fiber flakes in preparation for molding a part.
Figure 11:
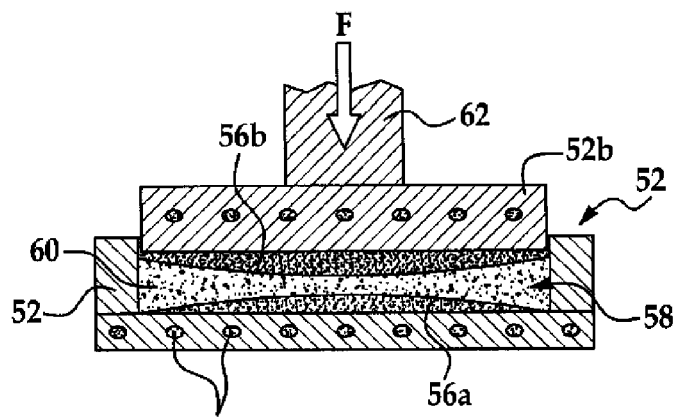
FIG. 11 is an illustration of a sectional view showing the mold of FIG. 10 having been closed to mold the charge.

FIGS. 10 and 11 illustrate apparatus for carrying out steps 32, 34 and 36 shown in FIG. 4. A compression mold 52 includes first and second mold portions 52a, 52b which may respectively have mold surfaces 56a, 56b corresponding to the shape of the desired part 20 (FIG. 1). The mold 52 includes a mold cavity 58 formed at least in part by the mold surfaces 56a, 56b. The mold 52 may include heating elements 54 for heating the mold 52 to the desired temperature. As shown in FIG. 10, with the mold 52 open, a premeasured quantity of prepreg flakes 24 may be introduced from a reservoir 48 into the mold portion 52a. The premeasured flakes 24 are loaded into the mold cavity 58 such that they are randomly oriented.

As shown in FIG. 11, the application of a force F through a ram 62 to the mold section 52b forces the mold portions 52a, 52b together, thereby compressing the mold charge 60 within the mold cavity 58. The fibers 24 may be only randomly distributed in two planes when they are initially placed in the mold 22a, however, once the resin melts in the flakes 24 melts to release the fibers 31, 33, the long flow distances within the mold cavity 22b "encourages" the fibers 33 (FIG. 3A) to distribute themselves into a complex, three dimensional, interlocking arrangement, caused by obstacles, bends, friction against the mold 22a, etc. The combination of the pressure and heat applied to the charge 60 results in the mixture of melted resin and individual fibers 31, 33 flowing over relatively long distances throughout the mold cavity 58. As the resin flows through the mold cavity 58, the flakes 31, 33 are carried along with the resin so as to be substantially uniformly distributed throughout the mold cavity 58, and substantially randomly oriented. Eventual cooling of the mold 52 results in consolidation of the thermoplastic resin, leaving the differing lengths of fibers 33 (FIG. 3A) originating from the flakes 24 integrated within the consolidated resin, with random orientations.

Figure 12:
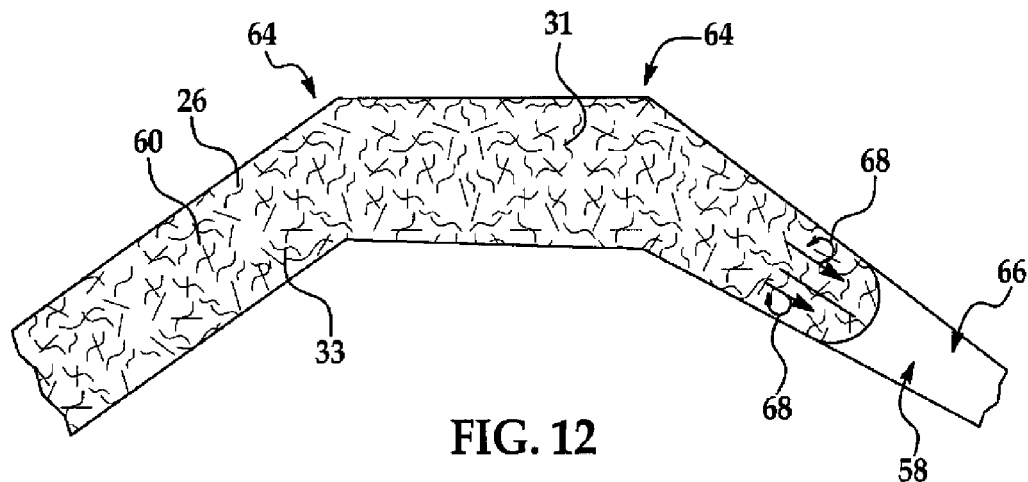
FIG. 12 is an illustration of a sectional view showing the flow of a mold charge through a portion of a mold cavity.

FIG. 12 graphically illustrates the flow of the charge 60 around angle features 64 of a mold cavity 58 having a tapered extremity 66. The flow may include turbulent components 68 that aid in maintaining a substantially uniform mixture and distribution of the fibers 31, 33 within the flowing resin so as to avoid resin or fiber rich, or resin or fiber poor areas within the finished part 20.

Figure 13:
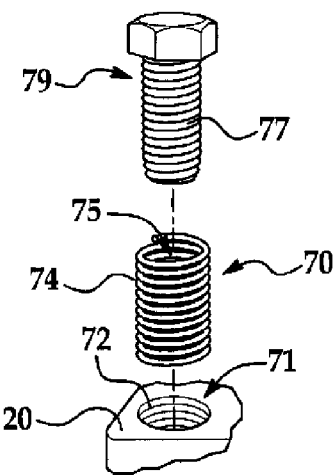
FIG. 13 is an illustration of an exploded orthogonal view of a compression molded thermoplastic part having a tapped hole for receiving a HeliCoil® insert and a threaded bolt.

FIG. 13 illustrates the installation of a HeliCoil® insert 70 into a typical thermoplastic part 20 made according to the disclosed embodiment. A hole 71 is formed in the part 20 as by drilling or molding. The hole 71 is then tapped to form a set of thermoplastic, internal threads 72 within the hole 71. Next, the HeliCoil® insert 70, which comprises a helically shaped metal coil 74, is wound into the thermoplastic threads 72 in the hole 71. Once installed in the hole 71 and seated within the thermoplastic internal threads 72, the metal coil 74 provides a set of metal, female (internal) threads 75 within the hole 71 that may threadably receive the male (external) threads 77 of another part (not shown) or a fastener such as a bolt 79.

Figure 14:
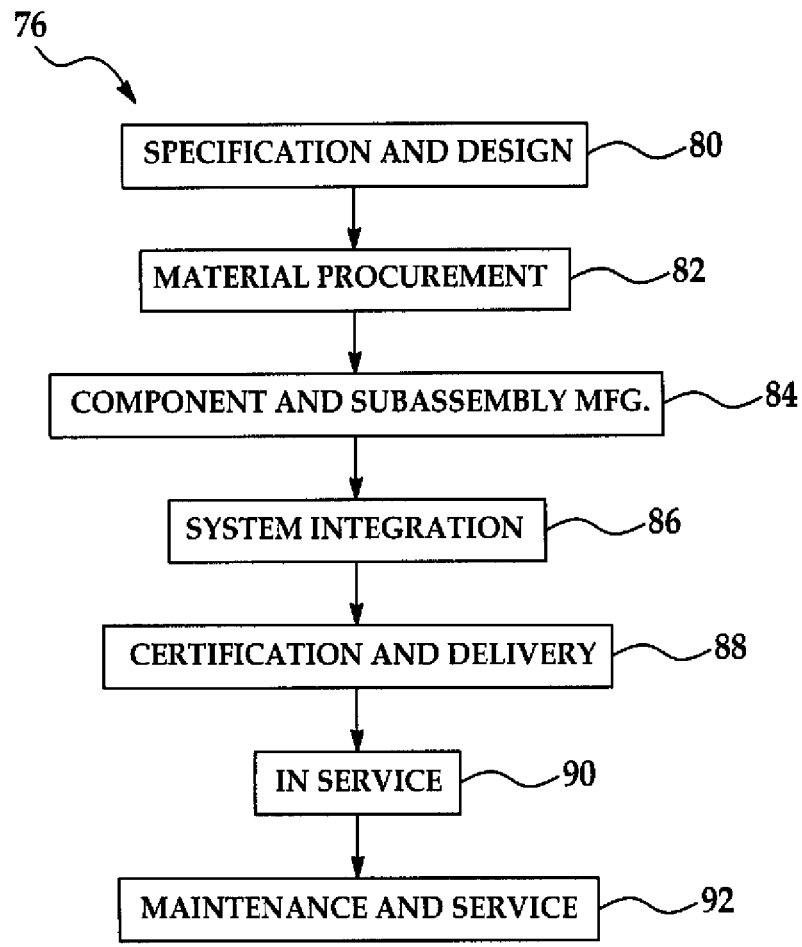
FIG. 14 is an illustration of a flow diagram of aircraft production and service methodology.
Figure 15:
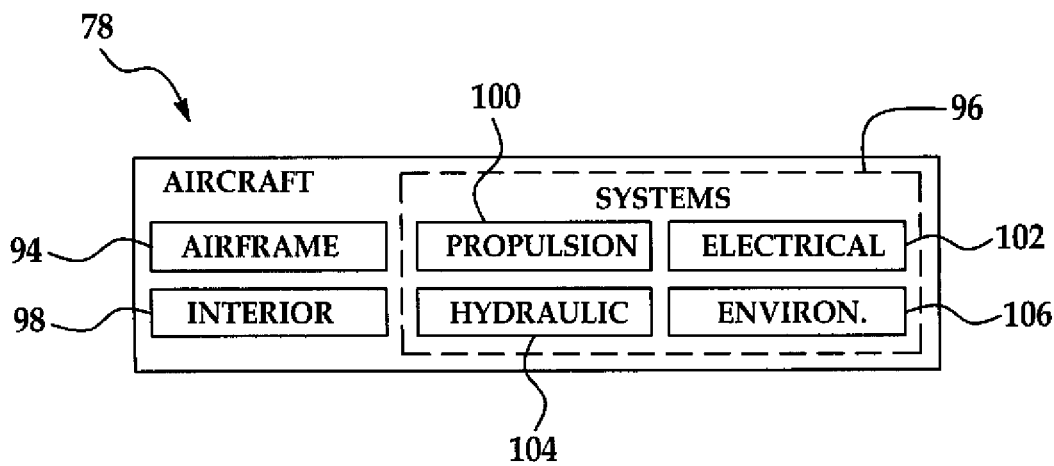
FIG. 15 is an illustration of a block diagram of an aircraft.

Embodiments of the disclosure may find use in a variety of potential applications, particularly in the transportation industry, including for example, aerospace, marine and automotive applications. Thus, referring now to FIGS. 14 and 15, embodiments of the disclosure may be used in the context of an aircraft manufacturing and service method 76 as shown in FIG. 14 and an aircraft 78 as shown in FIG. 15. During pre-production, exemplary method 76 may include specification and design 80 of the aircraft 78 and material procurement 82 in which the disclosed parts 20 may be specified for use in components and assemblies on the aircraft 78. During production, component and subassembly manufacturing 84 and system integration 86 of the aircraft 78 takes place. The disclosed compression molding method may be used to produce parts and components that are assembled during processes 84, 86. Thereafter, the aircraft 78 may go through certification and delivery 88 in order to be placed in service 90. While in service by a customer, the aircraft 78 is scheduled for routine maintenance and service 92 (which may also include modification, reconfiguration, refurbishment, and so on). The disclosed method may be used to parts 20 that are installed during the maintenance and service 92.

Each of the processes of method 76 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 15, the aircraft 78 produced by exemplary method 76 may include an airframe 94 with a plurality of systems 96 and an interior 98. The disclosed method may be used to produce parts 20 that form part of, or which may be installed on the airframe 94. Examples of high-level systems 96 include one or more of a propulsion system 100, an electrical system 102, a hydraulic system 104, and an environmental system 106. Any number of other systems may be included. Although an aerospace example is shown, the principles of the disclosure may be applied to other industries, such as the marine and automotive industries.

The disclosed molding method may be employed to mold parts during any one or more of the stages of the production and service method 76. For example, components or subassemblies corresponding to production process 84 may incorporate composite parts that are produced using the disclosed molding method. Also, one or more method embodiments, or a combination thereof may be utilized during the production stages 84 and 86, for example, by substantially expediting assembly of or reducing the cost of an aircraft 78.

Although the embodiments of this disclosure have been described with respect to certain exemplary embodiments, it is to be understood that the specific embodiments are for purposes of illustration and not limitation, as other variations will occur to those of skill in the art.

What is claimed:

1. A method of making a composite part, comprising:
    producing a plurality of flakes, the plurality of flakes including flakes of at least two different shapes respectively having fibers of differing lengths, the flakes of the at least two different shapes being mixed together;
    forming a mold charge, including introducing the plurality of flakes and a thermoplastic resin into a mold; and
    compression molding the mold charge into a part, creating a molded part, the compression molding including compressing the mold charge at a rate that results in turbulent flow of the mold charge through the mold.

2. The method of claim 1, wherein producing the plurality of flakes includes cutting each of the flakes from fiber reinforced prepreg.

3. The method of claim 1, wherein the thermoplastic resin is one of: PEI, PPS, PES, PEEK, PEKK, and PEKK-FC.

4. The method of claim 1, wherein:
    producing the plurality of flakes includes cutting each of the flakes from a dry fiber preform; and
    introducing the thermoplastic resin into the mold is performed separately from introducing the plurality of flakes into the mold.

5. The method of claim 1, further comprising:
    forming a hole in the molded part; and
    installing a hardware insert into the hole.

6. The method of claim 5, wherein:
    the hole is formed by drilling; and
    installing the hardware includes tapping threads in the molded part within the hole and threading an insert into the hole.

7. The method of claim 1, wherein the fibers are pre-impregnated with the thermoplastic resin.

8. A method of molding a fiber reinforced composite part, comprising:
    cutting a plurality of flakes from a unidirectional fiber preform pre-impregnated with a thermoplastic resin, the plurality of flakes including flakes of at least two different shapes respectively having fibers of differing lengths, the flakes of the at least two different shapes being mixed together;
    forming a mold charge by introducing a preselected quantity of the plurality of flakes into a mold; and
    compression molding the mold charge in a mold cavity, the compression molding including compressing the mold charge at a rate that results in turbulent flow of the mold charge through the mold.

9. The method of claim 8, wherein cutting the plurality of flakes includes die-cutting the plurality of flakes from a strip of unidirectional prepreg tape.

10. The method of claim 8, wherein at least certain of the flakes each have a shape of one of: a square, a rectangle, a circle, an ellipse, a trapezoid, a triangle, a hexagon, and a diamond.

11. The method of claim 8, wherein at least certain of the plurality of flakes include fibers having differing lengths.

12. The method of claim 8, wherein the thermoplastic resin is one of: PEI, PPS, PES, PEEK, PEKK, and PEKK-FC.

13. A method of making a part, comprising:
    cutting a plurality of first flakes from a first unidirectional carbon fiber thermoplastic prepreg tape, each of the plurality of first flakes having a first shape;
    cutting a plurality of second flakes from a second unidirectional carbon fiber thermoplastic prepreg tape, each of the plurality of second flakes having a second shape different than the first shape;
    mixing the plurality of first flakes and the plurality of second flakes into a mold charge having a mold cavity substantially conforming to a shape of the part; and
    compression molding the mold charge, including applying heat and pressure to the mold charge that results in a turbulent flow of the mold charge through the mold cavity, such that the combination of the flow rate and a viscosity of the mold charge results in the fibers in the plurality of first flakes and the plurality of second flakes being distributed substantially uniformly through the mold cavity with substantially random fiber orientations.

* * * * *